US011113764B1

(12) United States Patent
Koppes et al.

(10) Patent No.: US 11,113,764 B1
(45) Date of Patent: Sep. 7, 2021

(54) METHOD AND SYSTEM FOR CREATING AND TRACKING LIFE INSURANCE POLICIES IN SEPARATE ACCOUNTS INCLUDING MODIFIED STABLE VALUE PROTECTED FUNDS

(71) Applicant: Addle Management, LLC, St. Louis, MO (US)

(72) Inventors: Seth C. Koppes, Scottsdale, AZ (US); William A. Meier, St. Louis, MO (US)

(73) Assignee: Addle Management, LLC, St. Louis, MO (US)

( * ) Notice: Subject to any disclaimer, the term of this patent is extended or adjusted under 35 U.S.C. 154(b) by 0 days.

(21) Appl. No.: 13/862,251

(22) Filed: Apr. 12, 2013

Related U.S. Application Data (60) Provisional application No. 61/623,389, filed on Apr. 12, 2012.

(51) Int. Cl.
*G06Q 40/08* (2012.01)
(52) U.S. Cl.
CPC .................... *G06Q 40/08* (2013.01)
(58) Field of Classification Search
CPC ............................ G06Q 40/08; G06Q 10/0635
USPC ............................................................. 705/4
See application file for complete search history.

(56) References Cited

U.S. PATENT DOCUMENTS

| | | | |
|---|---|---|---|
| 5,926,792 A | 7/1999 | Koppes et al. | |
| 5,999,917 A * | 12/1999 | Facciani | G06Q 40/00 705/35 |
| 7,249,037 B2 | 7/2007 | Koppes et al. | |
| 2002/0013751 A1 | 1/2002 | Facciani et al. | |
| 2004/0215493 A1 | 10/2004 | Koppes et al. | |
| 2005/0055295 A1* | 3/2005 | Bateson | G06Q 40/02 705/35 |
| 2005/0071263 A1* | 3/2005 | Janssen | G06Q 40/02 705/35 |

(Continued)

OTHER PUBLICATIONS

Decision on Invalidity, *Bancorp Services v. Sun Life Assurance Co. et al.*, Federal Circuit, Oct. 2011 (Appeal No. 2011-1467).

(Continued)

*Primary Examiner* — Scott C Anderson
(74) *Attorney, Agent, or Firm* — Oblon, McClelland, Maier & Neustadt, L.L.P.

(57) ABSTRACT

A system and method for administering an insurance policy in general accounts and in separate accounts including a modified stable value protected investment including an improved surrender payment protocol. The system and method includes tracking the value of investments and an MSVP value in a life insurance contract after a termination of life insurance coverage has occurred. When the system determines that the value of the MSVP equals a predetermined value (e.g., zero) or that a maturity date for the policy or stable value protected investment has occurred, the system causes an amount equal to the value of the MSVP division to be paid to the contractholder. Upon such payment, the MSVP product provider shall have no further liability under the MSVP. The contractholder may have an option to elect at any time to receive a payment amount equal to the value of the underlying assets of the stable value protected investment. In such event, the MSVP product provider shall have no further liability under the MSVP.

44 Claims, 5 Drawing Sheets

(56) References Cited

U.S. PATENT DOCUMENTS

| | | | |
|---|---|---|---|
| 2007/0265889 A1 | 11/2007 | Koppes et al. | |
| 2008/0147447 A1* | 6/2008 | Roche .................... | G06Q 40/08 705/4 |
| 2009/0132430 A1* | 5/2009 | Weiss .................... | G06Q 40/02 705/36 R |

OTHER PUBLICATIONS

Memorandum and Order (on invalidity), *Bancorp Services v. Sun Life Assurance Co. et al.*, Civil Action No. 00-cv-01073 (CEJ), Feb. 14, 2011.

* cited by examiner

METHOD AND SYSTEM FOR CREATING AND TRACKING LIFE INSURANCE POLICIES IN SEPARATE ACCOUNTS INCLUDING MODIFIED STABLE VALUE PROTECTED FUNDS

CROSS REFERENCE TO CO-PENDING APPLICATION

This application is related to and claims priority under 35 U.S.C. 119(e) to U.S. Application No. 61/623,389, filed Apr. 12, 2012. The contents of that application are incorporated herein by reference.

FIELD OF THE INVENTION

The present invention is directed to an automated system for tracking, reconciling and administering the values of improved life insurance policies in general accounts and in separate accounts including Stable Value Protected funds, and in one embodiment, to life insurance policies including an improved surrender payment protocol.

DISCUSSION OF THE BACKGROUND

Known life insurance policies in separate accounts including Stable Value Protected funds have two separately tracked values: "book value" and "market value."

The premiums paid under life insurance policies in separate accounts including Stable Value Protected funds may be invested in certain variable investment options (a "Separate Account"). A Separate Account is a segregated investment account established to separate the assets funding the Policy from the other assets of the insurance company, although the insurance company is considered the owner of the assets of the Separate Account. The Separate Account is further segmented into "Divisions." The net premiums are applied to the Separate Account and allocated to one or more of the existing Divisions based on the decisions of the contractholder. The policy is considered "variable" since the accumulation value of the policy (and if applicable, each certificate issued under the policy) is not guaranteed, but rather, varies based on the investment experience of the Division. The death benefit is equal to a stated amount (or the variable insurance amount), made up in part of the value of the Separate Account and in part from the insurance company's general assets.

Certain Divisions offer a Stable Value Protected (or Protection) product (generically referred to as the "SVP Product" but such reference is not limited to any specific embodiment), which is designed to smooth fluctuations in the value of the underlying investments of a Division (generically referred to as the "SVP Division" but such reference is not limited to any specific embodiment). SVP Divisions may be portfolios that purchase an SVP Product from an SVP Writer. Separate SVP Sub-Divisions are established for each contractholder that allocates policy values to the SVP Division. At least one known SVP Product provides, among other things, that if the market value of the Division ("market value") is less than the book value of the Division ("book value"), the SVP Writer will make up the difference (generically referred to as the "SVP Value" but such reference is not limited to any specific embodiment) in the event the policy is surrendered.

The book value of the SVP Sub-Division will grow at a crediting rate which is reset periodically (e.g., quarterly). Changes in book value may be accounted for and/or tracked on a periodic basis (e.g., daily, weekly, monthly, or quarterly) and the rate at which the book value changes may also be reset periodically (e.g., at the same time or at a different time than the changes in book value are accounted for). The market value of the Division, however, is a value of the underlying investments (not including the SVP Product) that have been made in the portfolio. The crediting rate reset process is designed, among other things, to amortize or reduce the SVP Value over time. One way to amortize or reduce a positive SVP value is to set the crediting rate lower than the anticipated growth of the underlying investments.

As the value of the SVP Product grows an SVP Writer may be concerned about (i) the magnitude of its exposure and (ii) the possibility that the contractholder may surrender the policy if the crediting rate is reduced, especially when it is reduced to zero (at which point the book value will remain the same and the policy will become a non-income producing asset).

SUMMARY OF THE INVENTION

As described herein, a computer system administers an investment, where the computer system includes at least one computer processor and at least one memory for storing computer executable instructions. When the computer executable instructions are executed by the at least one computer processor, the computer system performs the following: tracking an investment value of at least one stable value protected investment utilizing a surrender payment protocol option; tracking an asset value of at least one underlying asset associated with the at least one stable value protected investment; receiving a termination indication that a contract holder of a life insurance contract including the at least one stable value protected investment has requested termination of the life insurance contract; determining a difference representing an extent to which the investment value exceeds the asset value; and providing a payment indication that the contract holder be paid an amount based on the investment value when the difference is at most a first predetermined threshold value. As used herein, "asset value" is a value of any asset (e.g., securities, investments, cash, fees corresponding to the life insurance policy and contract rights).

According to one aspect, the computer system provides the payment indication if the difference is at most the first predetermined threshold value in a first timeframe. According to a second aspect, the computer system provides the payment indication in a second timeframe if the difference is more than the first predetermined threshold value in the first timeframe.

Upon termination of the insurance contract, the computer system can request liquidation of the at least one underlying asset associated with the at least one stable value protected investment and/or request an estimate of the investment value corresponding to the at least one underlying asset associated with the at least one stable value protected investment.

BRIEF DESCRIPTION OF THE DRAWINGS

The following description, given with respect to the attached drawings, may be better understood with reference to the non-limiting examples of the drawings, wherein.

DETAILED DESCRIPTION OF THE INVENTION

An improved surrender payment protocol (generically referred to herein as "ISPP" but such reference is not limited to any specific embodiment) may be utilized in connection with an SVP Product to reduce the exposure of the SVP product provider (herein also referred to as an SVP Writer) and to provide increased flexibility under the policy to the contractholder that allocates policy assets to an SVP Sub-Division.

An improved surrender payment protocol may also be used in connection with a policy in which assets are allocated to the general account of the insurance company.

An ISPP may be implemented after a surrender of a policy has occurred to reduce the value of an SVP prior to the time for payment, which may be "n" years (or months or days) after the effective date of the surrender, thereby creating a modified SVP (generically referred to as "MSVP" or "MSVP Poduct" but such reference is not limited to any specific embodiment). An administrative system may be used that tracks and manages the process and/or an MSVP.

Embodiments of the invention include a computer system with specially programmed software to track information and manage the MSVP Divisions or Sub-Divisions described herein. Such a system may also generate reports for the different parties (e.g., contractholders, insurance company, investment managers, MSVP writers, etc.) and/or tax reports. Such a system may cause alerts to be sent to various parties upon the occurrence of certain events (e.g., an MSVP equals, exceeds or is less than a predetermined value, the crossing above or below a threshold that is tracked, the change in age of a group of insureds). The system may also determine and/or track a maturity date for an MSVP Sub-Division.

Figure 1:
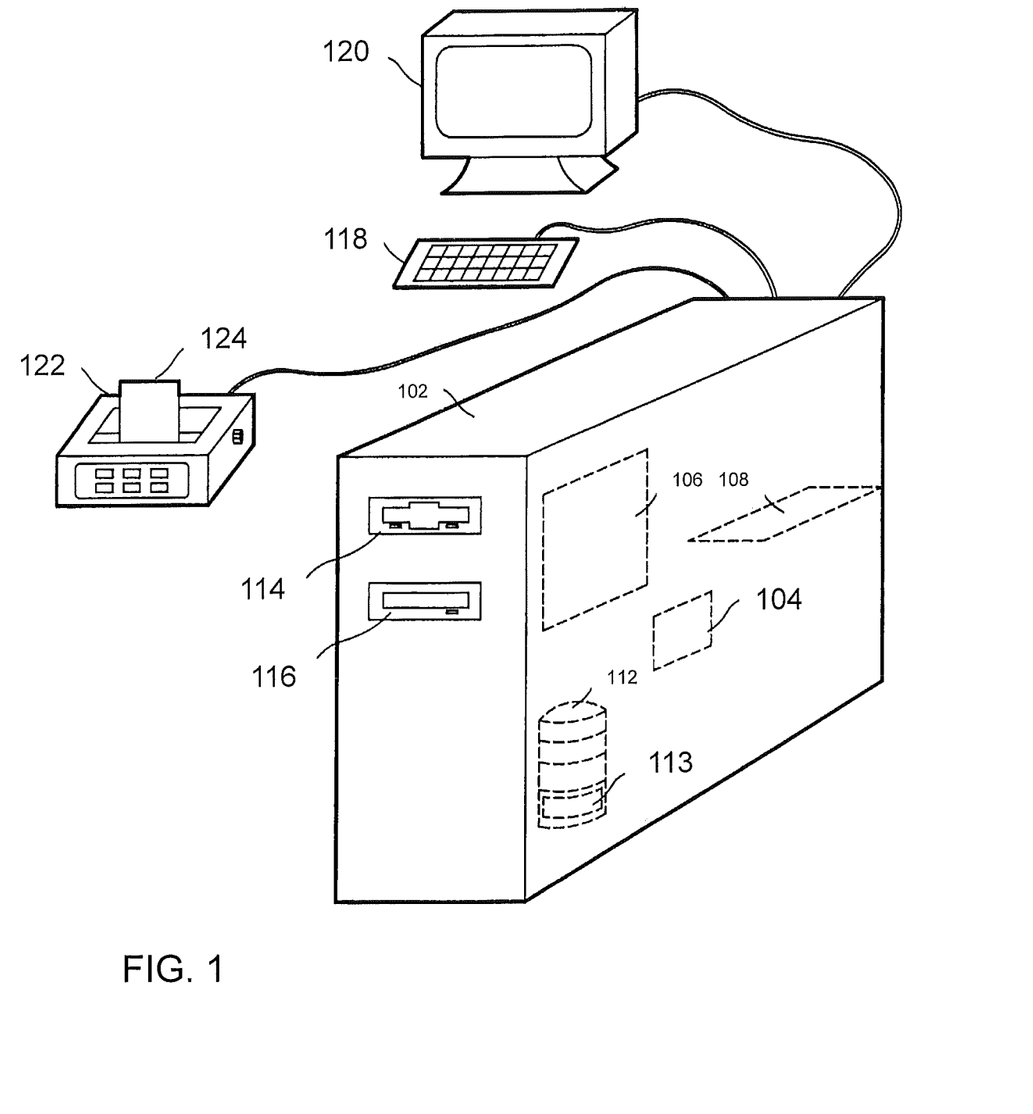
FIG. 1 is an illustration of an exemplary computer system acting as an administration system for the investments described herein.

An exemplary embodiment of such an administrative computer system is illustrated in FIG. 1. Within a computer 102, there are provided: a central processing unit for a memory subsystem 106, a communications card 108 (e.g., an Ethernet card or a fax/modem card), a digital storage (e.g. a hard disk drive or an array of hard disk drives) 112, a low density removable medium storage (e.g., a floppy disk drive or USB flash drive) 114 and a high density removable medium storage (e.g., compact disc drive, a DVD drive, a Blu-ray drive or tape drive) 116. Furthermore, keyboard 118 and monitor 120 are connected to the computer system 102 for inputting and outputting data, respectively. An additional printer 122 for printing reports 124 is also provided.

The computer system 102 has a central processing unit 104 which can comprise any one of the commercially available central processing units (e.g., Intel Xeon, Core, Pentium or 80×86 family of processors, Motorola 680×0 family of processors, Power PC processors, etc.) to direct and coordinate the activities of the other components. The memory subsystem 106 comprises a combination of read only memory (ROM) and random access memory (RAM), and the memory's subsystem 106 stores commands to be executed by the central processing unit 104. Together the central processing unit 104 and memory subsystem 106 control the other devices of the system. A communications card 108, such as a network interface card, connects to a wide area network such as the Internet, using wired or wireless communications and using any number of data transfer protocols (e.g., HTTP, HTTPS, FTP, SMTP) to transfer information between the computer system and entities such as investment managers, insurance and annuity companies, SVP product providers and contractholders. Such data may be displayed by a web browser that connects to a web server on the computer 102. In an alternate embodiment the web server is run on a second computer system 102 and exchanges information with the first computer system 102. The communications card 108 additionally is used to send confirmations to such entities. The communications card 108 sends and receives information by using an installed program which runs on the computer system 102. The program in an alternate embodiment is run on a second computer system 102 and exchanges information with the first computer system 102. In another embodiment, multiple communications cards (e.g., Ethernet, fax/modems, fax-boards or modems) are installed in the computer system 102 to provide connections to multiple entities simultaneously. Alternatively, a fax/modem, connects to a telephone line (not shown) to transfer information. The system is additionally used to contact outside information providers and asset managers.

The system 102 may also utilize various databases on the digital storage 112. Such a database may be used by any of the applications on the system 102 that retrieve information from or store information into the various databases. Such information may include investment values and values of underlying assets as described in greater detail herein. The database in an alternate embodiment is run on a second computer system 102 and exchanges information with the first computer system 102.

Digital storage 112 also is used to store both programs (e.g., operating systems and user applications) and a database 113. The programs are loaded from the digital storage 112 into at least one memory subsystem 106, and they are then executed by at least one CPU 104. The database 113 of information describes the assets, investments, census, mortality tables, and other policy-related data and investments being managed by the systems described herein. Currently available commercial databases such as DB 2/2 for OS/2, Microsoft Access for Windows, Microsoft SQL Server, and Oracle's SQL server are suitable for storing asset and investment information. In addition, open source databases, such as MySQL, could be utilized. Additional programs and information can be written to the digital storage 112 having been read from the low density removable medium storage 114 and high density removable medium storage (e.g., compact-disc) 116 or having been transmitted the computer system 102 via the communications card 108. The system further includes a computer readable media (e.g., high density removable storage 116) for controlling a computer to manage an administration and tracking system. A keyboard 118 additionally is used for entering data into the computer systems, and a computer monitor 120 is used to display both graphical and textual information from the computer systems. A printer 122 prints reports. The above-described computer can be either a physical computer or a virtual computer running in a virtual machine emulator such as VMWare.

Figure 2:
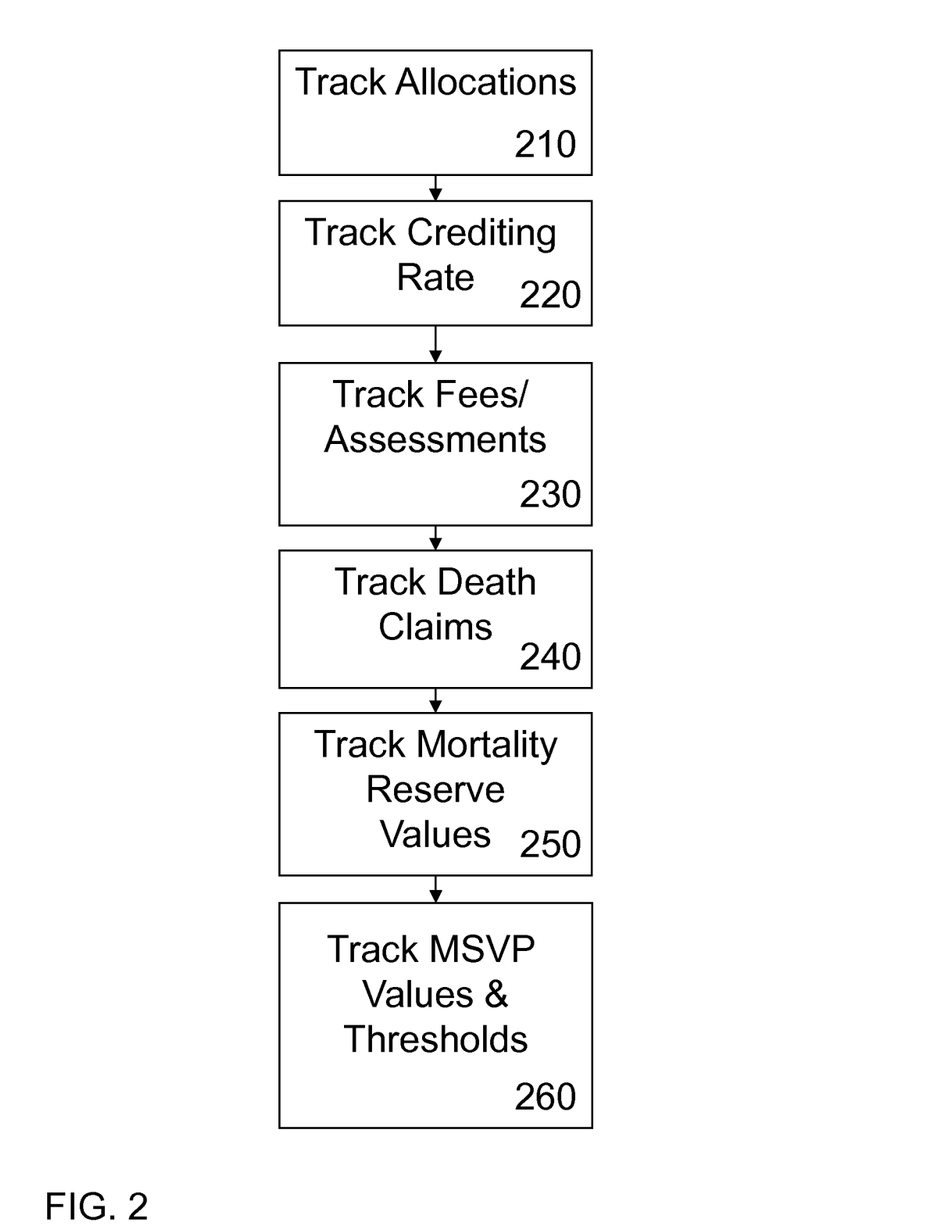
FIG. 2 is a flowchart showing administrative processing steps during a period of normal operations.

The administration of an MSVP Sub-Division Division during normal operations is characterized by the steps of FIG. 2. The exact order of steps is not intended to be limiting as long as data needed by one step is received and/or calculated before it is needed in a subsequent step. The steps may additionally be performed in parallel where they are independent. In step 210, the system can track allocations. (As used herein, "tracking" may include any or all of, importing data, recording calculation parameters, performing calculations, recording calculations and storing results, e.g., into a database.) Generally, allocations into the MSVP Sub-Division will increase both the book and market values of a MSVP Sub-Division. The amount of the increase to book and market values may be equal or the increases to book value may be greater than the increases to market value as occurs in known SVP Divisions. The system can record allocations into a MSVP Division and applicable MSVP Sub-Division. Allocations can be sourced from new funds entering the contract or from funds previously held in other investment options or reserves. New funds entering the contract can be a result of premium payments (possibly funded by death benefit reinvestments) and could also result from expense credits.

The system can gather information regarding allocation source, allocation amounts, and allocation date and apply these values to the policy's Division values. The system can also identify and calculate all deductions that are required for the form of allocation involved. For example, receipt of premium requires the calculation and application of state premium taxes, DAC taxes, agent commission charges and/or other charges contractually required. The system can communicate the allocation amounts to the investment manager for action and reconciles with the investment manager after the amounts have been transferred to the Division.

In step 220, the system can track a crediting rate for each MSVP Sub-Division. A MSVP Sub-Division crediting rate is calculated and recorded on the system along with the period of time that the rate is in effect. Using the MSVP Sub-Division crediting rate the system can calculate/determine the MSVP Sub-Division book value. The system can also record and track the market value of the MSVP Division and applicable MSVP Sub-Division.

In step 230, the system can calculate fees and assessments related to the MSVP Sub-Division. Deductions from the Sub-Division include asset-based charges and insurance-based assessments. Other types of fees and assessments may also be calculated and processed. Asset-based charges may include fees such as account management, investment management, Mortality and Expense Risk charge (M&E), SVP fees and MSVP fees. Insurance-based assessments include fees such as mortality retention charges and Cost of Insurance (COI) assessments (which in the case of experience-rated contracts are transferred to the Mortality Reserve). The system applies the deductions to the Sub-Division's book and market values and communicates these amounts to the investment manager and insurance company or its agent for redemption action. Calculated fees and assessments are communicated to the insurance company or its agent for appropriate distribution of fees and COI assessments.

In step 240, the system can respond to death claims recorded against the policy. When a death claim is processed, all assets attributable to the insured's certificate are liquidated at book value. The underlying market fund is reduced by the book value of the insured's certificate and the MSVP % value increases.

In step 250, the system can track the value of the Mortality Reserve in the case of experience-rated contracts. This includes tracking the current Mortality Reserve crediting rate, the target reserve and the current balance. The insurance company periodically directs refunds from the Mortality Reserve to the investment divisions which the system will record as allocations described above.

In step 260, the system can record and/or track information such as (1) MSVP percentage threshold, (2) MSVP dollar threshold, (3) MSVP Sub-Division book value, (4) MSVP Sub-Division market value, (5) MSVP percentage, (6) MSVP dollar amount, (7) book value/market value relationships, (8) death benefits, (9) death claims recorded against the policy, (10) the addition of premiums, (11) premium thresholds, (12) allocations from one Division or Sub-Division to another Division or Sub-Division, (13) expense or reserve credits, and (14) other sources for reducing or paying an MSVP value.

The system can, at various times, determine if an ISPP option is in effect, and, if so, performs the processing described below with respect to the ISPP option.

The system can also record, track and administer any other information, calculations, and/or thresholds determined by the provisions of the MSVP Division or Sub-Division or the MSVP Writer.

Figure 3:
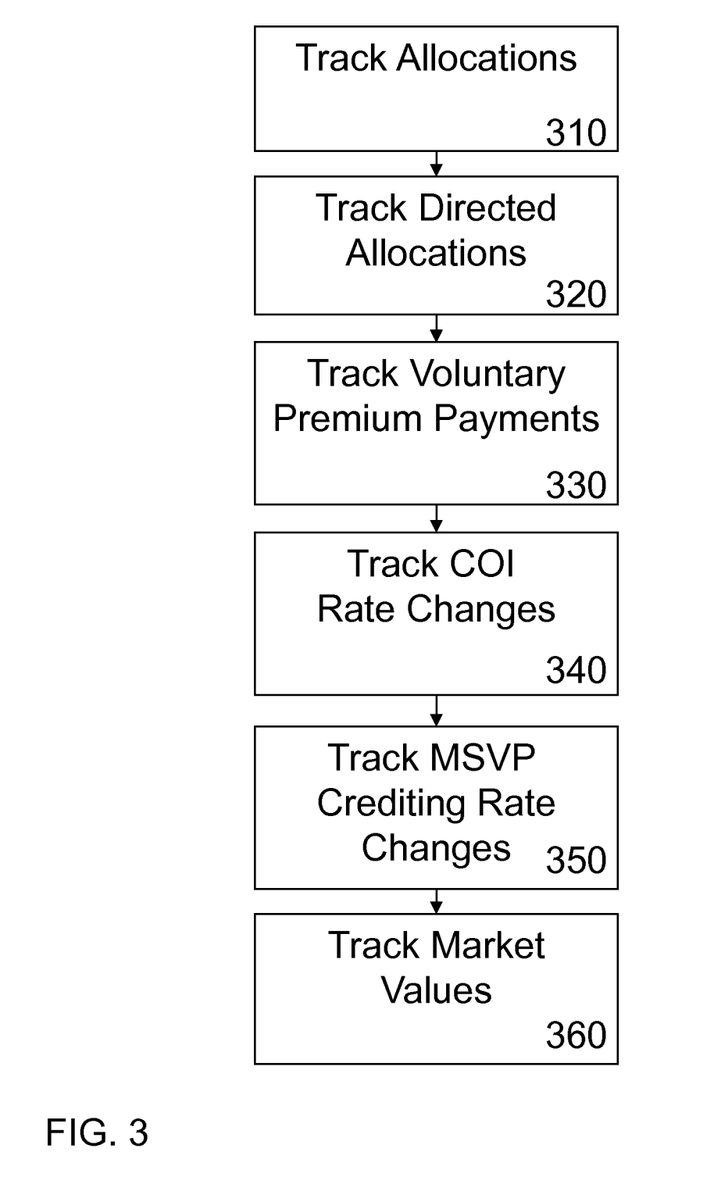
FIG. 3 is a flowchart showing additional administrative processing steps.

As shown in FIG. 3, the system optionally performs operations including: (1) tracking allocations, (2) tracking directed allocations, (3) tracking voluntary premium payments, (4) tracking COI rate changes, (5) tracking MSVP crediting rate changes, (6) tracking market value. Each of those operations may have one or more of the sub-steps described below.

To implement one version of a MSVP, a new MSVP Division can be created or an existing SVP can be modified. If a new MSVP Division is created, the new MSVP Division can be made available to all contractholders (minimum investment limits may apply) that own a particular type (e.g., series) of SVP or MSVP policy. Some SVP or MSVP Divisions or Sub-Divisions include restrictions on reallocations by a contractholder from one SVP or MSVP Division to another SVP or MSVP Division.

When creating an MSVP from an existing SVP, various steps may need to be taken. For example, a contractholder can reallocate existing book value of at least one SVP Sub-Division to the new MSVP Sub-Division (together with existing SVP Value).

Upon the occurrence of any event or condition that is specified by the terms of the MSVP Division or Sub-Division or by the MSVP (generically referred to as a "Transition Trigger" but such reference is not limited to any specific embodiment) (exemplary Transition Triggers are described below), the MSVP Writer or the insurance company may have the right to take certain actions, including actions to amortize the value of the MSVP Product. These actions may include reallocating all of a portion of an MSVP Sub-Division to a low risk or low volatility investment (e.g., a money market or short term government bond Division), resetting the crediting rate (to not less than 0% or 0.1%), and/or changing the amortization period (which may be subject to a maximum period of years). For certain Transition Triggers, the contractholder may also have the right to take certain actions, e.g., reallocate all or a portion of an MSVP Sub-Division to a low risk or low volatility investment (e.g., a money market or short term government bond Division).

An example of a crediting rate reset process is as follows:

Annual crediting rate=estimated yield[s] of underlying assets of the Division minus SVP amortization adjustment.

The SVP amortization adjustment equals (SVP Value divided by Investment Value) divided by an amortization period (e.g. 5 years). The amortization period may vary depending on the value of the calculation SVP Value divided by Investment Value (book value). For example as the value of the calculation SVP Value divided by Investment Value increases the amortization period may decrease. The crediting rate may also be subject to maximum reductions for the reset period and/or second period.

The system can determine when the MSVP Sub-Division reaches maturity. The maturity may be required to occur in the event that the MSVP value is equal to or less than a value of some MSVP threshold. Examples of other events that would require maturity to occur include, but are not limited to (1) a specified period of time; (2) a specified amount of death benefits have been paid; or (3) market value is equal to or greater than a threshold amount. Maturity may occur during the period after the contractholder has surrendered the policy.

As described above, the MSVP Sub-Division may include provisions defining certain "Transition Triggers." Examples of such "Transition Triggers" include, but are not limited to: (a) the book value of the MSVP Sub-Division falls below a specified amount, (b) the value of an MSVP Product for an MSVP Sub-Division equals or exceeds a specified percentage, (c) the average attained age of the Insureds under the Policy, weighted by each Certificate's Variable Insurance Amount or face amount, is greater than a specified age, (d) an Investment Adviser ceases for any reason to act as an investment manager for a non-SVP Division in which an MSVP Sub-Division invests, unless the insurance company appoints another investment manager for the non-SVP Division and the MSVP Writer consents in writing not to treat the change of investment managers as a Transition Trigger, and (e) a measurement designed to track whether yields are increasing for the assets of a Division (e.g., the trailing "n" quarter average yield of the assets of the Proceeds Division (or an index) shows an increase in yields (where "n" is between 1 and 40 quarters, but preferably 20 quarters).

In order to provide, manage, track and report on MSVPs and MSVP Sub-Divisions, a specially programmed computer system (e.g., computer 102) is preferably utilized that eases management. Such a computer system may provide creation of an MSVP Sub-Division and monitoring of a created MSVP Sub-Division. In order to create an MSVP Sub-Division, the system may be initialized with information such that an MSVP Sub-Division is an available investment division, by product, and/or by policy. The system can configure division properties as any other SVP division (e.g., by specifying Name, Investment Manager, Fee Structure, crediting rate process).

As not all MSVP Sub-Divisions may utilize the same set of options resulting from a Transition Trigger, the system may include available MSVP Sub-Division options and their configuration parameters. For example, election options available to the MSVP Writer may include, but are not limited to: (1) transfer market value to Money Market or other low risk investment option and (2) reset the crediting rate.

The system may also be configured to track/specify properties specific to MSVP Sub-Divisions, including, but not limited to: (1) the primary SVP or MSVP Writer (and what, if anything, its corresponding primary liability limit is (e.g. 15% of book value), (2) whether a secondary SVP or MSVP writer exists, and if so, who it is and what, if any, liability limit it has, (3) what Transition Triggers exist for each MSVP division under the contract and what their configurations should be. (Thus, an MSVP Writer may have primary liability for any MSVP value or may be secondary to at least one other MSVP Writer.)

As described above, the system may also coordinate communication with the various parties. As participants in the MSVP change and/or are added, the system tracks those changes (e.g., by tracking the MSVP Writer and/or the secondary MSVP Writer).

While the above discussion has focused on either a single MSVP Writer or an MSVP Writer and a secondary MSVP writer, alternate groupings of MSVP Writers and SVP Writers can be used. For example, an SVP Writer may act as the primary SVP writer for all or a portion of the divisions in a life insurance policy while an MSVP Writer acts as the "secondary." In such a configuration, the primary SVP Writer and the secondary MSVP Writer would be obligated for their respective portions of the SVP/MSVP value. Similarly, an MSVP Writer could act as the primary and an SVP Writer could act as the secondary. Furthermore, more than two levels of SVP/MSVP Writers can be used (e.g., three or four with at least one MSVP Writer), creating a hierarchy of SVP/MSVP Writers.

Also, rather than, or in addition to, utilizing multiple levels in a hierarchy, the MSVP and SVP writers may instead utilize shared risks such that multiple Writers exist on the same level of the hierarchy, but for a fixed percentage of the SVP/MSVP value. For example, an SVP Writer and an MSVP Writer may both be at the first level of the hierarchy and share (50/50 or 60/40, etc.) the risk of paying off the SVP/MSVP value up to a fixed threshold (e.g., which could be as great as 100%).

In the embodiments described above where MSVP and SVP Writers are used together, the system as described above may additionally track triggers, thresholds and information related to SVP Divisions and/or Sub-Divisions in addition to triggers, thresholds and information related to MSVP Divisions and/or Sub-Divisions.

In general, each MSVP is intended to smooth the market value fluctuation of the MSVP Sub-Division's investment in the Corresponding Division(s) over the term of a policy, If a policy is not surrendered, it will generally remain in force during the entire life of the Insureds. The use of the term "Corresponding Division" generically refers to the divisions of a separate account established by the life insurance company that invest in a portfolio of securities and other instruments according to the applicable investment objectives and guidelines, but such reference is not limited to any specific embodiment. The Corresponding Divisions may be available for direct allocation of Investment Value or through an MSVP Sub-Division. Thus, over the long-term, the Investment Value of an MSVP Sub-Division will be equal to the market value of the MSVP Sub-Division's investment in the Corresponding Division, as reduced by all Policy fees and charges, including the MSVP fee. The MSVP is generally not intended to provide principal or creditworthiness protection of the investments of the Corresponding Divisions.

In one embodiment, generally, the Investment Value of each MSVP Sub-Division equals the Investment Value of each MSVP Sub-Division as of the prior Business Day plus increases (A) minus subtractions (B). The increases (A) may include (A1) the amount of interest credited, which is calculated using a daily crediting rate as determined periodically by the MSVP Writer or insurance company, for each day occurring following the last Business Day up to and including the current Business Day; provided that if it is a leap year, February 29th may not count as a day (the "Calculation Period"), and (A2) any allocations to the MSVP Sub-Division, including allocations due to premiums, reallocations, Expense Credits and Experience Credits, effective on the current Business Day. The subtractions (B) may include (B1) Policy fees and charges deducted from the MSVP Sub-Division during the Calculation Period, including the fees payable with respect to the MSVP or investment advisory fees; and (B2) the Investment Value redeemed from the MSVP Sub-Division on the current Business Day due to Policy transactions including the Investment Value of the Certificate of any Insured for whom a Death Benefit is paid or insurance coverage is cancelled as consented to by the insurance company.

In general, the value of an MSVP is the difference between (i) the Investment Value of the MSVP Sub-Division and (ii) the Investment Value of the Corresponding Division held by the MSVP Sub-Division. Under the terms of the MSVP, the Investment Value of each MSVP Sub-Division will grow at a periodically (e.g., quarterly) resetting crediting rate which reflects market conditions and amortizes the value of the MSVP to zero over time. Amortizing the value of the MSVP should reduce over time the differences between the Investment Value of the MSVP Sub-Division and the Investment Value of the Corresponding Division held by the MSVP Sub-Division. (The crediting rate for the different time periods may either be the same or they may be calculated differently for different time periods.)

As described above, crediting rates are used in the administration of the investments described above, and those crediting rates can vary over time and in light of various conditions. Crediting rates can be set based on a number of factors, including, but not limited to: (1) market conditions at the time of setting each crediting rate, (2) anticipated total return (including any principal, interest and dividend payments or stock dividends) and duration of the Corresponding Division, (3) the MSVP value, if any, (4) a guaranteed minimum crediting rate (e.g., 0.0%, 0.1%) (which applies for all MSVP Sub-Divisions), and (5) a maximum change in the annualized crediting rate in any quarter.

After the initial crediting rate period, in general, crediting rates can be reset on all MSVP Sub-Divisions periodically effective on the Reset Date. Crediting rates may not be reset during certain periods (e.g., when an election is made upon the occurrence of a Transition Trigger (generically referred to as a "Transition Election" but such reference is not limited to any specific embodiment). In such cases, the MSVP Writer may have the right to immediately reset the crediting rate to a fixed rate (e.g., 0.0%, 0.1%) and may have the right to keep the crediting rate at that fixed rate.

In one embodiment, the following formulas will generally be used, other than when an Transition Election has been made, to calculate the annual and daily crediting rates (subject to the minimum crediting rate):

ACR=YTM−SARA, where:

ACR is the annual crediting rate; YTM is selected on each Reset Date by the MSVP Writer, and is any of the following (i) the yield to maturity of the benchmark of the Corresponding Divisions, (ii) the anticipated yield of the assets in the Corresponding Divisions, as reported by the Investment Adviser, (iii) the yield of the assets in the Corresponding Divisions, as determined by the MSVP Writer based upon current market conditions or (iv) previous ACR; and SARA is the MSVP Amortization Rate Adjustment, which may be positive or negative, computed according to the table below; however, the maximum impact of SARA on ACR in any quarter is limited as set forth in the following table.

|  | Value of MSVP as a % of Investment Value | | |
|---|---|---|---|
|  | Up to 7% | 7.01% to 10% | 10.01% and up |
| SARA | MSVP%/5 | MSVP %/4 | MSVP %/3 |
| Maximum Change in ACR in any Quarter | 0.35% | 0.60% | 0.85% |

Example 1

If the YTM equals 8.5% and the value of the MSVP equals 5% of the Investment Value, the ACR for the next quarter would, in general, be:

YTM−SARA=YTM−MSVP %/5=8.5%−5%/5=7.5%

However, the maximum impact of SARA on ACR is limited in any quarter to 0.35% in this example. Thus, if the current ACR equals 9%, then the ACR for the next quarter would be 9%−0.35% or 8.65%, rather than 7.5%.

Example 2

If the YTM equals 5.5% and the value of the MSVP equals 5% of the Investment Value, the ACR for the next quarter would, in general, be:

YTM−SARA=YTM−MSVP %/5=5.5%−5%/5=4.5%

However, the maximum impact of SARA on ACR is limited in any quarter to 0.35% in this example. Thus, if the current ACR equals 4.0%, then the ACR for the next quarter would be 4.0%+0.35% or 4.35% rather than 4.5%.

Daily Crediting Rate:

$DCR=[(1+ACR)^{1/365}]-1$ where:

DCR=daily crediting rate (expressed as a decimal)
ACR=annualized crediting rate (expressed as a decimal).

In an alternative embodiment, "Absolute Value of MSVP as a % of Investment Value" may be used in the exemplary table above in place of "Value of MSVP as a % of Investment Value."

In another embodiment of an MSVP, a contractholder can elect or be provided an improved surrender payment protocol (generically referred to as "ISPP" but such reference is not limited to any specific embodiment) option when the contractholder terminates the life insurance coverage via surrender. The contractholder may also elect or be provided an ISPP option at the time of allocation to any MSVP Sub-Division or at other times. The ISPP operates as described below. The insurance coverage will terminate on the effective date of the surrender ("Surrender Effective Date"). Accordingly, no Death Benefit is payable for any death occurring on or after the Surrender Effective Date.

One embodiment of an ISPP option is described in greater detail below. As shown in the exemplary embodiment of FIG. 4, a contract holder 405, an insurance company 410, an MSVP writer 430, an investment manager 425, a custodian 415, an escrow agent or trustee 435 and a pricing provider 420 communicate to administer a life insurance policy including a stable value protected investment and to handle post-termination processing of the life insurance policy when the contract holder 405 terminates the life insurance policy. Contract holder 405 is the entity that has made premium payments into the separate or general account of the insurance company utilizing an MSVP. Insurance company 410 maintains the stable value protected investment within the general account or the separate account of the insurance company. Custodian 415 provides custody services for the underlying assets associated with the at least one stable value protected investment. Pricing provider 420 delivers prices of the underlying assets associated with the at least one stable value protected investment to other entities (e.g., the insurance company 410, the custodian 415, and the investment manager 425). Investment manager 425 provides investment management services on the underlying assets associated with the at least one stable value investment. MSVP writer 430 may be responsible for paying an amount of MSVP value. Escrow agent 435 holds an offsetting value in an escrow or trust utilized to offset the difference between the investment value of the at least one stable value protected investment and the value of the underlying assets associated with at least one stable value protected investment. In alternative embodiments, the roles of plural of the entities described above may be combined into a single entity or further split into additional entities.

Figure 4:
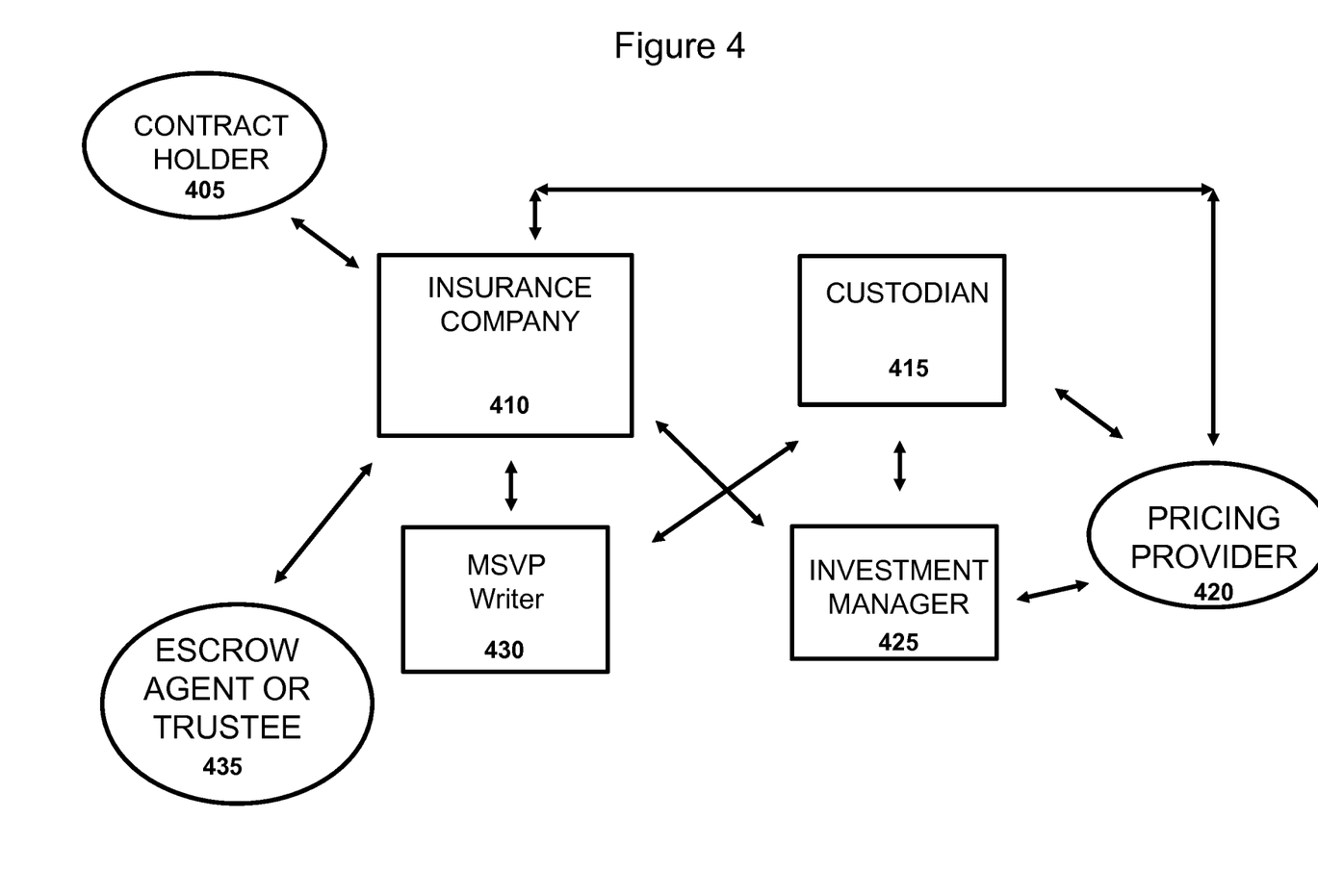
FIG. 4 is an illustration of communications between various exemplary parties during processing by an exemplary administrative system.
Figure 5:
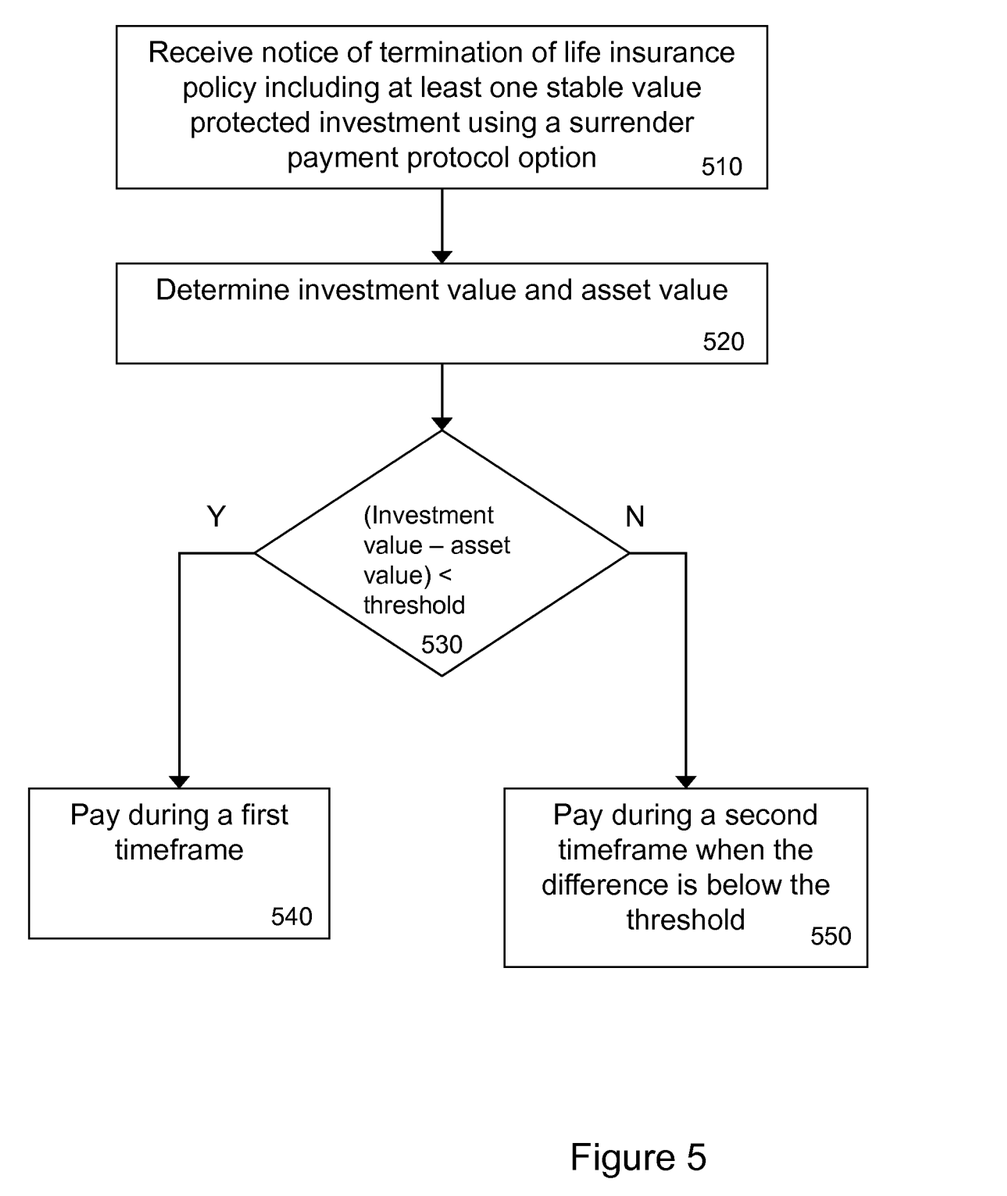
FIG. 5 is a flowchart showing exemplary processing steps for processing a termination notice for a life insurance policy including at least one stable value protected investment using a surrender payment protocol option.

As shown in FIG. 5, an insurance company receives from the contractholder a notice of termination of the of life insurance policy including at least one stable value protected investment using a surrender payment protocol option. (Step 510.) Alternatively, other entities (e.g., MSVP Writer) may receive the notice of termination. Following the Surrender Effective Date, for each MSVP Sub-Division to which Investment Value is allocated, the insurance company will liquidate the MSVP Sub-Division's interest in the Corresponding Division (e.g., by notifying an investment manager 425). The custodian 415 may then hold the value of the liquidated assets. The insurance company will request the orderly liquidation of the underlying assets held by the respective Corresponding Division within "n" months of the Surrender Effective Date. In an alternative embodiment, the insurance company may request an estimate of the liquidation value of the underlying assets held by the respective Corresponding Division.

Following the liquidation (or the estimation) of the interests in the respective Corresponding Divisions, the corresponding investment values and asset values are determined. (Step 520). The difference between the investment values and asset values (i.e., the value (or estimated value) of all MSVPs) will be determined for all MSVP Sub-Divisions to which Investment Value is allocated. If the sum of all MSVPs is equal to or less than a predetermined threshold value (e.g., zero) (step 530), the Investment Value held in all MSVP Sub-Divisions will be paid within 'n" months of the Surrender Effective Date and all MSVPs shall terminate on the Surrender Effective Date. (Step 540.) If the sum of all MSVPs is greater than a predetermined/threshold value (e.g., zero), then the following procedures will apply. (Step 550.) In alternate embodiments, the threshold value can be a different, fixed monetary amount or a percentage (e.g., a percentage (such as 1%)). In yet another embodiment, instead of comparing the difference between the investment value and the value of the assets, an alternative function can be used and compared against a fixed or percentage value. For example, the investment value and/or asset value can be compared to determine if it/they are greater than or less than a fixed value or a relative value. Similarly, a ratio of investment value to asset value could be used, as could a moving average and/or a ratio of moving averages.

Following the Surrender Effective Date, the Investment Value held in the various MSVP Sub-Divisions will be transferred from those MSVP Sub-Divisions to one or more Divisions selected by the insurance company in consultation with the MSVP Writer (generically referred to as a "Proceeds Division" but such reference is not limited to any specific embodiment). In alternative embodiments, the MSVP Writer or the contractholder will select the one or more Proceeds Divisions or the one or more Proceeds Divisions may be determined by reference to the one or more MSVP Sub-Divisions to which policy allocations were made as of the Surrender Effective Date. All MSVPs held by those MSVP Sub-Divisions may be consolidated into a single MSVP held by one or more Proceeds Divisions. In an alternate embodiment, the Investment Value held in the one or more MSVP Sub-Divisions will remain in the one or more MSVP Sub-Divisions as existed as of the date of surrender and will not be transferred from those MSVP Sub-Divisions to a Proceeds Division. The name of the MSVP Sub-Division may be changed. The procedures described below with respect to Proceeds Divisions would then apply to the various MSVP Sub-Divisions as existed as of the date of surrender. In an alternative embodiment, the assets of the one or more MSVP Sub-Divisions may be transferred in kind to one or more Proceeds Divisions. The one or more MSVP Sub-Divisions may be closed after the transfer of the assets to the one or more Proceeds Divisions. The investment guidelines of the one or more Proceeds Divisions may be identical, or similar, to the investment guidelines of the MSVP Sub-Divisions from which the assets were transferred.

The initial Investment Value of the one or more Proceeds Divisions will equal the sum of the Investment Value held in the one or more MSVP Sub-Divisions. The Investment Value will grow at the crediting rate as described above and the subsequent Investment Value of the one or more Proceeds Divisions will be computed as described below. In an alternate embodiment, the Investment Value will grow at a crediting rate after surrender that is determined in a manner that is different than the crediting rate determination process prior to surrender, and the subsequent Investment Value of the Proceeds Division will be computed based on the post-surrender crediting rate. In an alternate embodiment, the initial Investment Value of the one or more Proceeds Divisions will be adjusted and will not equal the sum of the Investment Value held in the one or more MSVP Sub-Divisions The Investment Value of a Proceeds Division is based on a value calculated by the MSVP Writer or insurance company under the terms of the MSVP. The Investment Value of a Proceeds Division will be equal to the Investment Value as of the prior Valuation Day plus increases (A) minus subtractions (B). The increases (A) may include the amount of (A1) interest credited, which is calculated using a daily crediting rate as determined periodically by the MSVP Writer or the insurance company, for the current valuation period, (A2) any Expense Credit or Experience Credit or additions from another source as discussed below and (A3) any reallocations to the Proceeds Division. Interest may not be credited for any February $29^{th}$. The subtractions (B) may include the amount of (B1) Policy fees and charges deducted from the Proceeds Division, which may include Account Management Fees, Investment Advisory Fees, and the MSVP Fees, (B2) the Investment Value of the Certificate of any Insured for whom a Death Benefit is paid and whose death occurred prior to the Surrender Effective Date and (B3) any reallocations from the Proceeds Division.

The value of the MSVP held by a Proceeds Division is the difference between (i) the Investment Value of the Proceeds Division and (ii) the value of the portfolio of securities and other investment instruments held by the Proceeds Division.

The MSVP moderates fluctuations in the market value of the portfolio of securities and other investment instruments held by the Proceeds Division. In general, the crediting rates set by the MSVP Writer are applied such that: for a Proceeds Division, it will over a period of time, cause the MSVP value to be amortized and approach a value of zero or a negative number.

Within 'n' months (e.g., six months or some other period of preferably less than one year) of the date that the value of the MSVP in the one or more Proceeds Divisions is equal to or less than a predetermined value (e.g., zero), the insurance company will liquidate the Proceeds Division and the contractholder will be paid the Investment Value of the Proceeds Division in satisfaction of the ISPP Option and the MSVP will terminate. In another alternative, the insurance company may liquidate all or a portion of the Proceeds Division prior to the date that the value of the MSVP in the Proceeds Division is equal to or less than a predetermined value (e.g., zero).

These conditions are designed to amortize the value of the MSVP. The earnings or income on the investments of the one or more Proceeds Divisions will reduce the obligations of the MSVP Writer. The date by which the one or more Proceeds Divisions will be liquidated will be based upon a variety of factors, including but not limited to: (i) the value of the MSVP, (ii) the market interest rate environment, (iii) the amount of earnings and income earned on the investments of the one or more Proceeds Divisions, (iv) the crediting rate.

In another embodiment, the ISPP option may provide that the Investment Value of the one or more Proceeds Division (and/or an ISPP Trust MSVP Division, described in more detail below) will be paid to the contractholder after a period of time (e.g, "n" years after the Surrender Effective Date) has expired (generically referred to as the "ISPP Maturity Date" but such reference is not limited to any specific embodiment) regardless of whether the value of the MSVP in the Proceeds Division (and/or the ISPP Trust MSVP Division) is equal to or less than a predetermined value (e.g., zero) at, or at any time before, the ISPP Maturity Date. The MSVP Writer may be responsible for all or a portion of any MSVP value that exists as of the the ISPP Maturity Date.

In another alternative, the MSVP Writer may be responsible for paying an amount of MSVP value, which may be a portion of the MSVP value, and such amount will not be amortized or reduced by the crediting rate process or other methods. Such amount may be determined by agreement, by events or conditions that occur prior to or as of the Surrender Effective Date, or by events or conditions that occur after the Surrender Effective Date. One example of an event that may occur is default or loss with respect to assets in a Proceeds Division, an MSVP Sub-Division, and/or a ISPP Trust MSVP Division. In another alternative, the ISPP Option may provide that the Investment Value of the one or more Proceeds Divisions (and/or the ISPP Trust MSVP Divisions) will be paid to the contractholder within 'n' months (e.g., six months or some other period of preferably less than one year) of the date that the value of the MSVP in the Proceeds Division (and/or the ISPP Trust MSVP Division) is equal to or less than a predetermined value (e.g., zero) but the calculation of the value of the MSVP shall not take into account any amount of the MSVP value for which the MSVP Writer is responsible. In another alternative, the amount of the MSVP value for which the MSVP Writer is responsible may be amortized through the crediting rate process or another process so that the amount of the MSVP value for which the MSVP Writer is responsible can be reduced or eliminated on or before the ISPP Maturity Date.

In an alternate embodiment Expense Credits and Experience Credits (or additions to the one or more Proceeds Divisions from another source) that occur during the operation of the ISPP Option may be utilized (as offset values) to reduce the value of the MSVP. This will be achieved by increasing the market value of the one or more Proceeds Division by an amount equal to the offset value (i.e., Experience Credit, Expense Credit or other source). The system may increase the book value of the one or more Proceeds Divisions in an amount less than or equal to the offset value or not at all. This market/book allocation process may represent a value agreed upon by the MSVP Writer and the contractholder, may be specified in the MSVP Division or Sub-Division or Proceeds Division or may be selected in the MSVP Writer's discretion. This market/book allocation process for one allocation source, (e.g., an Experience Credit) may or may not be the same as the established allocation process for any other allocation source (e.g., Expense Credit). The MSVP Writer can be supplied with sufficient details to track this market/book allocation process (e.g., using a printed statement, an email notification or an update on a web site).

The another source may include, but is not limited to, all or a portion of the Policy fees and charges deducted from the one or more Proceeds Divisions, which may include Account Management Fees, Investment Advisory Fees, and the MSVP Fees, or may be contributions made by the MSVP Writer, the insurance company or the contractholder or may be all or a portion of the Mortality Reserve or earnings on amounts held in the Mortality Reserve.

In another alternative, the Expense Credits, Experience Credits or another source may be held in escrow or trust. The amount held in escrow or trust may be pledged for payment, if any, of an MSVP value that exists as of the ISPP Maturity Date or may be used to reduce an MSVP value prior to the ISPP Maturity Date. The amount held in escrow or trust may be used to support a guarantee by a third party of payment, if any, of an MSVP value that exists as of the ISPP Maturity Date.

In another embodiment, the system performs an analysis to determine a probability that the MSVP Product value for a policy or for one or more MSVP Sub-Divisions (or Proceeds Divisions) will be equal to or less than a predetermined value (e.g., zero) prior to a period of time (e.g, "n" years) after the assumed Surrender Effective Date if a surrender were to occur on a specified date and the ISPP Option procedures were utilized. The MSVP Product value may be the value that exists as of the date that the analysis is performed or an assumed MSVP Product value.

The system inputs projected performance data for assets held in a MSVP Sub-Division, Corresponding Division or Proceeds Division, a hypothetical portfolio of assets or a financial index. The projected performance data may be received from a third party. In another alternative, the system generates the projected performance data.

The performance data may consist of "n" (e.g., 10,000) projected scenarios for the performance of the assets over a period of time (e.g., 25 years). The number "n" should be large enough to provide a statistically significant number of scenarios.

The system will utilize the projected performance data to generate "n" (e.g., 10,000) projected scenarios and predict an MSVP Product value for one or more MSVP Sub- Divisions, Corresponding Divisions or Proceeds Divisions, or the policy, for specified future times (e.g., daily, monthly, quarterly, annually).

In another alternative, the system will generate the "n" (e.g., 10,000) projected scenarios and predict an MSVP Product value for one or more MSVP Sub-Divisions, Corresponding Divisions or Proceeds Divisions, or the policy for specified future times (e.g., daily, monthly, quarterly, annually) by utilizing an assumption that one or more of Expense Credits, Experience Credits or another source (e.g., all or a portion of the Policy fees and charges deducted from the Proceeds Division, which may include Account Management Fees, Investment Advisory Fees and MSVP Fees) may be utilized to reduce the value of the MSVP prior to a period of time (e.g, "n" years) after the assumed Surrender Effective Date.

In another alternative, the system will generate an analysis of calculation of capital required to meet expected liabilities of the MSVP Writer based on the "n" projected scenarios of MSVP Product value. The analysis may utilize an average (or other statistical methodology, e.g., standard deviation, percentile ranking, number of standard deviations from the mean) of the MSVP Product values predicted for all or a portion of the "n" projected scenarios. The portion of the "n" projected scenarios may include the projected scenarios that produce a positive MSVP Product value after the expiration of a period of time (e.g, "n" years) after the assumed Surrender Effective Date. The analysis may utilize various combinations of the alternatives described above.

In other alternatives, the Investment Value held in the various MSVP Sub-Divisions may: (1) be transferred from those MSVP Sub-Divisions to an ISPP Trust through the orderly liquidation of the underlying securities and instruments held by the respective Corresponding Divisions, or (2) not be transferred but maintained in the same MSVP Sub-Divisions. In general, those assets, regardless of where they are held, are referred to generically as "ISPP assets" but such reference is not limited to any specific embodiment. In an embodiment utilizing an ISPP Trust, (a) the ISPP Trust will hold all ISPP assets in trust for the benefit of the contractholder and (b) the policy will no longer have any investment or interest in the separate account established by the insurance company other than rights existing under the MSVP Agreement with the MSVP Writer.

The ISPP assets will grow at a post-termination crediting rate (e.g., a crediting rate determined in the same manner as the crediting rate is determined under the MSVP Sub-Divisions, or a credit rate specific to the post-termination time period). The ISPP assets may be invested by the contractholder utilizing options offered for the ISPP assets (e.g., using the same type of investments as were available pre-termination). Should an ISPP Trust be used, each ISPP Trust MSVP division combines an investment in (a) an ISPP Trust Corresponding Division and (b) an MSVP value. The ISPP Trust MSVP division may pay fees from the assets of the division, which may include an investment management fee payable to the Investment Manager of the division selected by the contractholder, an MSVP Fee payable to the MSVP Writer, and an Account Management Fee.

When the value of the ISPP Trust MSVP is equal to or less than a predetermined value (e.g., zero, i.e., the value of the ISPP Trust MSVP division is equal to the value of the ISPP Trust Corresponding Division), the MSVP Writer shall pay to the contractholder an amount equal to the value of the ISPP Trust MSVP division. Upon such payment, the MSVP Writer shall have no further liability under the MSVP or the ISPP Trust MSVP.

The contractholder may have an option to elect at any time to receive a payment amount from one or more Proceeds Divisions or the ISPP Trust equal to the value of the one or more Corresponding Divisions or ISPP Trust Corresponding Divisions. In such event, the MSVP Writer may have no further liability or a reduced liability under the MSVP or the ISPP Trust MSVP.

If the contractholder does not elect the ISPP Option, upon surrender: (i) the value of the MSVP automatically becomes zero, (ii) the MSVP terminates; (iii) the contractholder will receive only the liquidation value of the interest in the one or more Corresponding Divisions held by the one or more MSVP Sub-Divisions. In another alternative, if the contractholder does not elect the ISPP option, upon surrender the value of the MSVP will be reduced to a value greater than zero and the MSVP will not terminate.

The contractholder may have an option to receive any amounts remaining in the Mortality Reserve. The contractholder may be required to deliver a waiver of incurred but not yet paid Death Benefits to the insurance company in order to receive such amounts.

In one embodiment, the contractholder only receives the value of the MSVP if the contractholder requests funds from the Policy by exercising its right to request a Maximum Withdrawal (as described in the U.S. Application No. 61/623,389, filed Apr. 12, 2012 incorporated by reference) or if the contractholder surrenders the Policy under the ISPP Option. In alternative embodiments, only one of the Maximum Withdrawal features or the ISPP Option will be available, but not all. Various combinations of the Maximum Withdrawal features and the ISPP Option can also be provided in alternative embodiments.

The term "Investment Value," as used herein, refers to the value of the assets of the Divisions in the separate account of the policy or the value of assets allocated under the policy to the general account of the insurance company (as described below). Thus, for example, in a Corresponding Division, the Investment Value is based on the market value of the portfolio of assets in the Corresponding Division, in a MSVP Sub-Division, the Investment Value is based on the value of the MSVP (and SVP if applicable) and the market value of the portfolio of assets held by the Division, or portion thereof, credited to the MSVP Sub-Division, and in a Proceeds Division the Investment Value is based on the value of the MSVP (and SVP if applicable) and the market value of the portfolio of assets held by the Proceeds Division.

The terms MSVP Product and MSVP are used interchangeably herein and have the same meaning.

While an ISPP Option is in effect, the MSVP Writer or the insurance company may have the right to take certain actions to amortize the value of the MSVP Product upon the occurrence of certain events or conditions, referred to as Transition Triggers above. These actions may include reallocating all of a portion of a Proceeds Division to a low risk or low volatility investment (e.g., a money market or short term government bond Division), resetting the crediting rate (e.g., to not less than 0% or 0.1%), and/or changing the amortization period (which may be subject to a maximum period of years). For certain events or conditions, the contractholder may also have the right to take certain actions, e.g., reallocate all or a portion of a Proceeds Division to a low risk or low volatility investment (e.g., a money market or short term government bond Division). The system tracks these events or conditions and provides reports or notices to various parties including the MSVP Writer, the insurance company and the contractholder.

Exemplary Transition Triggers with respect to Proceeds Divisions include, but are not limited to: (a) the book value of the Proceeds Division falls below a specified amount, (b) the value of an MSVP Product for a Proceeds Division equals or exceeds a specified percentage, (c) the average attained age of the Insureds under the Policy, weighted by each Certificate's Variable Insurance Amount or face amount, is greater than a specified age, (d) an Investment Adviser ceases for any reason to act as an investment manager for a Proceeds Division, unless the insurance company appoints another investment manager for the Proceeds Division and the MSVP Writer consents in writing not to treat the change of investment managers as a condition or event for which it would have the right to take certain actions described above, and (e) a measurement designed to track whether yields are increasing for the assets of the one or more Proceeds Divisions (e.g., the trailing "n" quarter average yield of the assets of the Proceeds Division (or an index) shows an increase in yields (where "n" is between 1 and 40 quarters, but preferably 20 quarters).

In an alternative embodiment, the assets of the life insurance policy are not held within a separate account and rather are allocated to and held in the general account of the insurance company. A portion of the assets of the general account will be identified and tracked (generically referred to as "Identified Investments" but such reference is not limited to any specific embodiment). The Identified Investments may be subject to investment guidelines. The investment guidelines and the Identified Investments may be subject to change or may remain the same for the duration of the period that the assets are allocated to the general account. The value of the Identified Investments may be equal to the value of the assets allocated to the general account or the two values may be different. In other alternatives, the Identified Investments may be all assets of the general account and the Identified Investments may differ for different purposes (e.g. setting the crediting rate and determining when a payment will be made to a contractholder).

When assets of the life insurance policy are allocated to the general account, an Investment Value for such assets will be determined ("book value"). The Investment Value for the assets allocated to the general account will grow at a crediting rate. The crediting rate for the assets held in the general account is determined at the time that policy assets are allocated to the general account. The crediting rate will not change for the duration of the time period that assets are held in the general account. Alternatively, the insurance company (or an MSVP Writer) may determine adjustments to the crediting rate for the assets held in the general account from time to time. The adjustments may be determined in the discretion of the insurance company (or an MSVP Writer). In another alternative, the adjustments to the crediting rate may be based upon identified criteria. Such criteria may include the past or anticipated performance of Identified Investments or an index, including a financial performance index. The crediting rate may be used to amortize differences between the value of the Identified Investments and the Investment Value of the assets allocated to the general account. Crediting rate formulas similar to those described herein may be utilized.

Fees and charges incurred under the policy or during an ISPP Option may be deducted from the value of the Identified Investments and/or from the Investment Value of the assets allocated to the general account. Such fees and charges may include: (1) an investment management fee payable to the Investment Manager of the Identified Investments; and (2) an MSVP Fee payable to the MSVP Writer, if any. In another alternative, other fees may be paid and different methods for accrual and times for payment may be utilized.

In the event of a surrender of the policy, an ISPP Option may be utilized. A contractholder can elect or be provided an ISPP Option when the contractholder terminates the life insurance coverage via surrender. The contractholder may also elect or be provided an ISPP Option at the time of allocation to the general account or at other times. The ISPP Option operates as described below. The insurance coverage will terminate on the Surrender Effective Date. Accordingly, no Death Benefit is payable for any death occurring on or after the Surrender Effective Date. In an alternative embodiment, the contractholder provides a notice of surrender but the termination of insurance coverage does not occur until the value of the Identified Investments is greater than or equal to the Investment Value of the assets allocated to the general account.

Under the ISPP Option the following procedures, terms and conditions will apply. Following the Surrender Effective Date, the insurance company will liquidate the Identified Investments in the general account within "n" months of the Surrender Effective Date. In an alternative embodiment, the insurance company may estimate the liquidation value of the Identified Investments.

In an alternative embodiment, the Identified Investments will be liquidated and the proceeds thereof will be allocated to a separate account. In another alternative, the Identified Investments will be transferred in kind to a separate account. In such events, the ISPP Option procedures described above for a separate account may be utilized.

As used herein, the difference between the Investment Value of the assets allocated to the general account and the value of the Identified Investments is generically referred to as "GA Difference" but such reference is not limited to any specific embodiment.

If the GA Difference is equal to or less than a predetermined value (e.g., zero), the Investment Value is paid to the contractholder within "n" months (e.g., six) of the Surrender Effective Date. If the GA Difference is greater than a predetermined value (e.g., zero), the Investment Value will be paid to the contractholder within "n" months of the date that the GA Difference is equal to or less than a predetermined value (e.g., zero).

In another embodiment, the ISPP Option may provide that the Investment Value of the assets allocated to the general account will be paid to the contractholder after a period of time (e.g, "n" years after the Surrender Effective Date) has expired (generically referred to as the "ISPP Maturity Date" but such reference is not limited to any specific embodiment) regardless of whether the GA Difference is equal to or less than a predetermined value (e.g., zero) at, or at any time before, the ISPP Maturity Date. The insurance company (or an MSVP Writer) may be responsible for all or a portion of any GA Difference that exists as of the ISPP Maturity Date.

In another alternative, the insurance company (or an MSVP Writer) may be responsible for paying an amount of GA Difference, which may be a portion of the GA Difference, that exists as of the ISPP Maturity Date and such amount will not be amortized or reduced by the crediting rate process or other methods. Such amount may be determined by agreement, by events or conditions that occur prior to or as of the Surrender Effective Date, or by events or conditions that occur after the Surrender Effective Date. One example of an event that may occur is default or loss with respect to Identified Investments. In another alternative, the ISPP Option may provide that the Investment Value of the assets allocated to the general account will be paid to the contractholder within 'n' months (e.g., six months or some other period of preferably less than one year) of the date that GA Difference is equal to or less than a predetermined value (e.g., zero) but the calculation of the GA Difference shall not take into account any amount of the GA Difference for which the insurance company (or MSVP Writer) is responsible. In another alternative, the amount of the GA Difference for which the insurance company (or MSVP Writer) is responsible may be amortized through the crediting rate process or another process so that the amount of the GA Difference for which the insurance company (or MSVP Writer) is responsible is reduced or eliminated on or before the ISPP Maturity Date.

In an alternate embodiment Expense Credits and Experience Credits (or additional allocations to the general account from another source) that occur prior to or during the operation of the ISPP Option may be utilized (as offset values) to reduce the value of the GA Difference. This will be achieved by increasing the market value of the Identified Investments by an amount equal to offset values. The system may increase the book value of the assets allocated to the general account in an amount less than or equal to the offset values or not at all. This market/book allocation process may represent a value agreed upon by the insurance company (or MSVP Writer) and the contractholder, or may be selected in the insurance company's (or MSVP Writer's) discretion. This market/book allocation process for one allocation source, (e.g., an Experience Credit) may or may not be the same as the established allocation process for any other allocation source (e.g., Expense Credit). The MSVP Writer can be supplied with sufficient details to track this market/book allocation process (e.g., using a printed statement, an email notification or an update on a web site).

The another source may include, but is not limited to, Policy fees and charges incurred during a specified period of time (e.g., after the Surrender Effective Date) or may be contributions made by the insurance company (or MSVP Writer) or the contractholder or may be all or a portion of the Mortality Reserve or earnings on amounts held in the Mortality Reserve.

The crediting rate for the assets allocated to the general account will be determined in the same manner after the Surrender Effective Date as the crediting rate was determined prior to the Surrender Effective Date. In an alternate embodiment, the crediting rate for the assets allocated to the general account will be determined in a manner that is different than the crediting rate determination process prior to surrender.

The contractholder may have an option to elect at any time to receive a payment amount from the insurance company equal to the value of the Identified Investments. In such event, the insurance company (or MSVP Writer) may have no further liability or a reduced liability under the policy (or MSVP).

If the contractholder does not elect the ISPP option, upon surrender: (i) the contractholder will receive only the liquidation value of Identified Investments, (ii) the value of the MSVP, if any, automatically becomes zero and (iii) the MSVP, if any, terminates. In another alternative, if the contractholder does not elect the ISPP option, upon surrender the value of the MSVP will be reduced to a value greater than zero and the MSVP will not terminate.

While certain configurations of structures have been illustrated for the purposes of presenting the basic structures of the present invention, one of ordinary skill in the art will appreciate that other variations are possible which would still fall within the scope of the appended claims.

We claim:

1. A computer system for administering an investment comprising:
   at least one computer processor;
   at least one non-transient memory for storing computer executable instructions, wherein execution of the computer executable instructions by the at least one computer processor causes, after a termination indication has been received that a contract holder of a life insurance contract including at least one stable value protected investment utilizing a surrender payment protocol option has requested termination of the life insurance contract, and in response to receiving the termination indication according to the surrender payment protocol option, the computer system to perform:
   (a) tracking a varying investment value of the at least one stable value protected investment utilizing the surrender payment protocol option after the termination indication is received;
   (b) tracking a varying asset value of at least one underlying asset associated with the at least one stable value protected investment after the termination indication is received;
   (c) determining, after the termination indication is received, whether a difference representing an extent to which the varying investment value exceeds the varying asset value is at most a predetermined threshold value; and
   (d) providing a payment indication that the contract holder be paid an amount based on the varying investment value when the computer executable instructions (c) determine that the difference is at most the predetermined threshold value, wherein the surrender payment protocol option is an option associated with the at least one stable value protected investment to defer, after surrender, the payment of the proceeds due upon surrender of the life insurance contract if the varying investment value of the at least one stable value protected investment is greater than the varying asset value of the at least one underlying asset associated with the at least one stable value protected investment.

2. The computer system as claimed in claim 1, wherein the computer executable instructions for causing the computer system to perform providing the payment indication comprise computer executable instructions for causing the computer system to perform providing the payment indication if the difference is at most a first predetermined threshold value in a first timeframe.

3. The computer system as claimed in claim 2, wherein the computer executable instructions for causing the computer system to perform providing the payment indication comprise computer executable instructions for causing the computer system to perform providing the payment indication in a second timeframe if the difference is more than the first predetermined threshold value in the first timeframe.

4. The computer system as claimed in claim 1, wherein the computer executable instructions for causing the computer system to perform determining the difference further comprises computer executable instructions for causing the computer system to perform requesting liquidation of the at least one underlying asset associated with the at least one stable value protected investment.

5. The computer system as claimed in claim 1, wherein the computer executable instructions for causing the computer system to perform determining the difference further comprise computer executable instructions for causing the computer system to perform determining an estimated value of the at least one underlying asset associated with the at least one stable value protected investment.

6. The computer system as claimed in claim 1, wherein the computer executable instructions for causing the computer system to perform determining the difference further comprise computer executable instructions for causing the computer system to calculate an actual value of the at least one underlying asset associated with the at least one stable value protected investment.

7. The computer system as claimed in claim 1, wherein the computer executable instructions for causing the computer system to perform tracking the varying asset value of the at least one underlying asset associated with the at least one stable value protected investment and tracking the varying investment value of the at least one stable value protected investment utilizing the surrender payment protocol option further comprises computer executable instructions for causing the computer system to perform:
 determining a value of at least one payout corresponding to at least one insured for whom a death benefit is paid and whose death occurred prior to a date the life insurance contract was terminated; and
 deducting from the varying asset value the value of the at least one payout; and
 deducting from the varying investment value the value of the at least one payout.

8. The computer system as claimed in claim 1, wherein the computer executable instructions for causing the computer system to perform determining the difference further comprise computer executable instructions for causing the computer system to perform calculating an offset value corresponding to at least one of experience credits and expense credits.

9. The computer system as claimed in claim 1, wherein the computer executable instructions for causing the computer system to perform determining the difference further comprise computer executable instructions for causing the computer system to perform calculating an offset value corresponding to at least one of (1) fees collected from the life insurance policy, (2) contributions by an entity, (3) at least a portion of a Mortality Reserve and (4) at least a portion of earnings on amounts held in the Mortality Reserve.

10. The computer system as claimed in claim 9, wherein the entity comprises at least one of a Stable Value Product (SVP) writer, a Modified Stable Value Product (MSVP) writer and an insurance company.

11. The computer system as claimed in claim 8, wherein the predetermined threshold value is a first threshold value, and wherein the computer executable instructions for causing the computer system to perform determining the difference further comprises computer executable instructions for causing the computer system to perform determining if a difference between (a) the difference between the varying investment value and the varying asset value and (b) the offset value is at most a second threshold value.

12. The computer system as claimed in claim 11, wherein the computer executable instructions for causing the computer system to perform determining the difference further comprises computer executable instructions for causing the computer system to perform:
 instructing that the offset value be held in at least one of an escrow and a trust; and
 instructing that the offset value be utilized as a payment to reduce the difference between the varying investment value and the varying asset value.

13. The computer system as claimed in claim 9, wherein the predetermined threshold value is a first threshold value, and wherein the computer executable instructions for causing the computer system to perform determining the difference further comprises computer executable instructions for causing the computer system to perform determining if a difference between (a) the difference between the varying investment value and the varying asset value and (b) the offset value is at most a second threshold value.

14. The computer system as claimed in claim 13, wherein the computer executable instructions for causing the computer system to perform determining the difference further comprises computer executable instructions for causing the computer system to perform:
 instructing that the offset value be held in at least one of an escrow and a trust; and
 instructing that the offset value be utilized as a payment to reduce the difference between the varying investment value and the varying asset value.

15. The computer system as claimed in claim 8, wherein the computer executable instructions for causing the computer system to perform tracking the varying asset value of at least one underlying asset associated with the at least one stable value protected investment and tracking the varying investment value of at least one stable value protected investment utilizing the surrender payment protocol option further comprises computer executable instructions for causing the computer system to perform adding the offset value to the varying asset value without adding an entire amount of the offset value to the varying investment value.

16. The computer system as claimed in claim 9, wherein the computer executable instructions for causing the computer system to perform tracking the varying asset value of at least one underlying asset associated with the at least one stable value protected investment and tracking the varying investment value of at least one stable value protected investment utilizing the surrender payment protocol option further comprises computer executable instructions for causing the computer system to perform adding the offset value to the varying asset value without adding an entire amount of the offset value to the varying investment value.

17. The computer system as claimed in claim 1, wherein the computer executable instructions for causing the computer system to perform tracking the varying asset value of at least one underlying asset associated with the at least one stable value protected investment and tracking the varying investment value of at least one stable value protected investment utilizing the surrender payment protocol option further comprises computer executable instructions for causing the computer system to perform tracking a portion of the varying investment value of the at least one stable value protected investment that is not to be either amortized or reduced by a crediting rate.

18. The computer system as claimed in claim 17, wherein the portion corresponds to a portion of the underlying varying asset value for which at least one of a predetermined event and a predetermined condition occurred after the contract holder requested termination of the life insurance contract.

19. The computer system as claimed in claim 18, wherein the at least one of a predetermined event and a predetermined condition comprises at least one of a default and a loss.

20. The computer system as claimed in claim 1, wherein the at least one underlying asset associated with the at least one stable value protected investment is held in a separate account on behalf of the contract holder.

21. The computer system as claimed in claim 1, wherein the at least one underlying asset associated with the at least one stable value protected investment is held in a general account, and
wherein the computer executable instructions for causing the computer system to perform determining the difference comprise computer executable instructions for causing the computer system to perform tracking, after the contract holder has requested the termination of the life insurance contract, (1) the varying asset value of the at least one underlying asset associated with the investment that is held in the general account and (2) the varying investment value.

22. The computer system as claimed in claim 1, wherein the at least one underlying asset associated with the at least one stable value protected investment comprises investments.

23. The computer system as claimed in claim 1, wherein the at least one underlying asset associated with the at least one stable value protected investment comprises at least one of investments, cash, fees corresponding to the life insurance policy and contract rights.

24. The computer system as claimed in claim 1, further comprising computer executable instructions for causing the computer system to perform calculating financial requirements of an entity based upon estimated liabilities for the stable value protected investment under plural scenarios.

25. The computer system as claimed in claim 24, wherein computer executable instructions for causing the computer system to perform calculating the financial requirements of the entity based upon estimated liabilities for the stable value protected investment under plural scenarios comprise computer executable instructions for causing the computer system to perform calculating a composite financial requirement based upon estimated liabilities of the entity under plural scenarios.

26. The computer system as claimed in claim 25, wherein the composite financial requirement comprises at least one of an average, a standard deviation, a percentile ranking, and a number of standard deviations from a mean.

27. The computer system as claimed in claim 24, wherein the entity comprises at least one of a Stable Value Product (SVP) writer, a Modified Stable Value Product (MSVP) writer and an insurance company.

28. The computer system as claimed in claim 24, wherein the plural scenarios comprise at least a statistically significant number of scenarios.

29. The computer system as claimed in as claimed in claim 11, wherein the first threshold value and the second threshold value are the same.

30. The computer system as claimed in claim 1, further comprising computer executable instructions for causing the computer system to perform determining if a transition trigger has occurred after the contract holder has requested the termination of the life insurance contract.

31. The computer system as claimed in claim 30, wherein the transition trigger comprises at least one of: (a) the varying investment value falls below a specified amount, (b) the difference between the varying investment value and the varying asset value is at least a specified percentage of the varying investment value, (c) an investment manager ceases to act as an investment manager for the at least one underlying asset associated with the at least one stable value protected investment, unless an insurance company for the life insurance contract appoints another investment manager for the at least one underlying asset associated with the at least one stable value protected investment and a writer of the at least one stable value protected investment consents to the change of investment managers, and (d) a measure designed to track whether yields are increasing for the at least one underlying asset associated with the at least one stable value protected investment shows an increase in yields.

32. The computer system as claimed in claim 31, wherein the measure comprises a trailing "n" quarter average yield of the at least one underlying asset associated with the at least one stable value protected investment.

33. The computer system as claimed in claim 30, further comprising computer executable instructions for causing the computer system to perform requesting reallocation of the at least one underlying asset associated with the at least one stable value protected investment to an alternative set of assets when the transition trigger has occurred.

34. The computer system as claimed in claim 33, wherein the alternative set of assets comprises at least one of a low risk investment and a low volatility investment.

35. The computer system as claimed in claim 30, further comprising computer executable instructions for causing the computer system to perform requesting a change in an amortization period for a crediting rate for the at least one stable value protected investment when the transition trigger has occurred.

36. The computer system as claimed in claim 30, further comprising computer executable instructions for causing the computer system to perform requesting a change in a crediting rate for the at least one stable value protected investment when the transition trigger has occurred.

37. The computer system as claimed in claim 30, further comprising computer executable instructions for causing the computer system to perform providing an indication to at least one of an a Stable Value Product (SVP) writer, a Modified Stable Value Product (MSVP) writer, an insurance company and a contract holder when the transition trigger has occurred.

38. The computer system as claimed in claim 30, further comprising computer executable instructions for causing the computer system to receive an indication from at least one of a Stable Value Product (SVP) writer, a Modified Stable Value Product (MSVP) writer, an insurance company and a contract holder to perform at least one of a reallocation of at least one underlying asset associated with the at least one stable value protected investment to an alternative set of assets, a change in an amortization period for a crediting rate for the at least one stable value protected investment and a change in a crediting rate for the at least one stable value protected investment when the transition trigger has occurred.

39. The computer system as claimed in claim 1, wherein the computer executable instructions for causing the computer system to perform determining the difference further comprise computer executable instructions for causing the computer system to perform changing the predetermined threshold value by a value associated with a portion of the varying asset value of the at least one underlying asset for which at least one of a predetermined event and a predetermined condition occurred after the contract holder requested termination of the life insurance contract.

40. The computer system as claimed in claim 39, wherein the at least one of a predetermined event and a predetermined condition comprises at least one of a default and a loss.

41. The computer system as claimed in claim 1, wherein the computer executable instructions for causing the computer system to perform tracking the varying investment value further comprise computer executable instructions for causing the computer processor to increase according to a crediting rate the varying investment value.

42. The computer system as claimed in claim 1, further comprising computer executable instructions for causing the computer system to perform providing a reallocation indication when the difference is more than the predetermined threshold value.

43. The computer system as claimed in claim 1, further comprising computer executable instructions for causing the computer system to perform providing a payment indication at a predetermined time regardless of whether the difference is at most the predetermined threshold value.

44. The computer system as claimed in as claimed in claim 13, wherein the first threshold value and the second threshold value are the same.

* * * * *